United States Patent
Basso et al.

(10) Patent No.: US 7,577,151 B2
(45) Date of Patent: Aug. 18, 2009

(54) METHOD AND APPARATUS FOR PROVIDING A NETWORK CONNECTION TABLE

(75) Inventors: Claude Basso, Raleigh, NC (US); Jean Louis Calvignac, Raleigh, NC (US); Chih-Jen Chang, Apex, NC (US); Philippe Damon, Raleigh, NC (US); Natarajan Vaidhyanathan, Carrboro, NC (US); Fabrice Jean Verplanken, La Gaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 11/096,571

(22) Filed: Apr. 1, 2005

(65) Prior Publication Data

US 2006/0221977 A1 Oct. 5, 2006

(51) Int. Cl.
*H04L 12/56* (2006.01)
(52) U.S. Cl. .................................. 370/395.32; 717/109
(58) Field of Classification Search ................. 370/395, 370/466, 390; 713/201; 726/11; 709/245; 717/109
See application file for complete search history.

(56) References Cited

U.S. PATENT DOCUMENTS

| | | | |
|---|---|---|---|
| 5,058,110 A | 10/1991 | Beach et al. | |
| 5,430,842 A | 7/1995 | Thompson et al. | |
| 5,442,802 A * | 8/1995 | Brent et al. | 718/100 |
| 5,752,078 A | 5/1998 | Delp et al. | |
| 5,983,274 A | 11/1999 | Hyder et al. | |
| 6,400,730 B1 | 6/2002 | Latif et al. | |
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 | 1/2004 | Russell et al. | |
| 6,724,769 B1 | 4/2004 | Sang | |
| 6,728,929 B1 | 4/2004 | Luong | |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 | 9/2004 | Aweya et al. | |

(Continued)

FOREIGN PATENT DOCUMENTS

WO 03049488 A1 6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Thong H Vu
(74) *Attorney, Agent, or Firm*—Sawyer Law Group P.C.

(57) ABSTRACT

Method and apparatus for implementing use of a network connection table. In one aspect, searching for network connections includes receiving a packet, and zeroing particular fields of connection information from the packet if a new connection is to be established. The connection information is converted to an address for a location in a direct table using a table access process. The direct table stores patterns and reference information for new and existing connections. The connection information is compared with at least one pattern stored in the direct table at the address to find reference information for the received packet.

31 Claims, 8 Drawing Sheets

U.S. PATENT DOCUMENTS

| | | |
|---|---|---|
| 6,822,968 B1 | 11/2004 | Lim |
| 6,937,574 B1 | 8/2005 | Delaney et al. |
| 6,954,463 B1 | 10/2005 | Ma et al. |
| 6,970,419 B1 | 11/2005 | Kalkunte et al. |
| 6,976,205 B1 | 12/2005 | Ziai et al. |
| 6,988,235 B2 | 1/2006 | Brown |
| 7,023,811 B2 | 4/2006 | Pinto |
| 7,031,304 B1 | 4/2006 | Arberg et al. |
| 7,062,570 B2* | 6/2006 | Hong et al. ............... 709/238 |
| 7,098,685 B1 | 8/2006 | Agrawal et al. |
| 7,124,198 B2 | 10/2006 | Pinkerton |
| 7,131,140 B1* | 10/2006 | O'Rourke et al. ............ 726/11 |
| 7,134,796 B2 | 11/2006 | Anderson |
| 7,164,678 B2 | 1/2007 | Connor |
| 7,218,632 B1 | 5/2007 | Bechtolsheim et al. |
| 7,251,704 B2 | 7/2007 | Solomon |
| 7,254,138 B2* | 8/2007 | Sandstrom ................. 370/412 |
| 7,260,120 B2 | 8/2007 | Kang et al. |
| 7,269,661 B2 | 9/2007 | Ree et al. |
| 7,271,706 B2 | 9/2007 | Lee et al. |
| 7,272,704 B1 | 9/2007 | Nguyen et al. |
| 7,274,706 B1 | 9/2007 | Nguyen et al. |
| 7,283,528 B1 | 10/2007 | Lim et al. |
| 7,286,557 B2 | 10/2007 | Feuerstraeter et al. |
| 7,292,586 B2 | 11/2007 | Dewan et al. |
| 7,292,591 B2 | 11/2007 | Parker et al. |
| 7,295,553 B2 | 11/2007 | Saitoh |
| 7,298,761 B2* | 11/2007 | Hong ......................... 370/466 |
| 7,308,006 B1 | 12/2007 | Banerjee et al. |
| 7,334,216 B2* | 2/2008 | Molina-Moreno et al. .. 717/109 |
| 2001/0027496 A1 | 10/2001 | Boucher et al. |
| 2002/0112076 A1* | 8/2002 | Rueda et al. ................ 709/245 |
| 2003/0022792 A1 | 1/2003 | Nakamura et al. |
| 2003/0026252 A1* | 2/2003 | Thunquest et al. .......... 370/390 |
| 2003/0088689 A1 | 5/2003 | Alexander et al. |
| 2003/0103499 A1 | 6/2003 | Davis et al. |
| 2003/0154399 A1* | 8/2003 | Zuk et al. ................... 713/201 |
| 2003/0227920 A1 | 12/2003 | Benayoun et al. |
| 2004/0022094 A1 | 2/2004 | Radhakrishnan et al. |
| 2004/0030766 A1 | 2/2004 | Witkowski |
| 2004/0064590 A1 | 4/2004 | Starr et al. |
| 2004/0081145 A1 | 4/2004 | Harrekilde-Peterson et al. |
| 2004/0100952 A1 | 5/2004 | Boucher et al. |
| 2004/0109465 A1 | 6/2004 | Kim et al. |
| 2004/0128398 A1 | 7/2004 | Pettey |
| 2004/0218623 A1 | 11/2004 | Goldenberg et al. |
| 2005/0022017 A1* | 1/2005 | Maufer et al. ............... 713/201 |
| 2005/0076136 A1 | 4/2005 | Cho et al. |
| 2005/0089031 A1 | 4/2005 | Krueger |
| 2005/0108611 A1 | 5/2005 | Vogt |
| 2005/0114663 A1 | 5/2005 | Cornell et al. |
| 2005/0120160 A1 | 6/2005 | Plouffe et al. |
| 2005/0149677 A1 | 7/2005 | Shimada et al. |
| 2005/0256975 A1 | 11/2005 | Kaniz et al. |
| 2006/0031600 A1 | 2/2006 | Ellis et al. |
| 2006/0120289 A1 | 6/2006 | Cunningham |
| 2006/0187928 A1 | 8/2006 | McGee et al. |
| 2006/0216958 A1 | 9/2006 | Yee et al. |

OTHER PUBLICATIONS

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10Gbps Ethernet Media Access Controller for a 1Gbps/100Mbps Ethernet, located at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Balena, F., "Speed up searched with hash tables," Nov. 13, 2001, DevX.com all pages.

Balena, Francesco, "Speed Up Searched with Hash Tables," Nov. 13, 2001, DevX.com, all pages.

* cited by examiner

METHOD AND APPARATUS FOR PROVIDING A NETWORK CONNECTION TABLE

CROSS-REFERENCE TO RELATED APPLICATIONS

The present application is related to the following copending U.S. patent applications:

U.S. patent application, Ser. No. 11/097,608, entitled "Host Ethernet Adapter for Networking Offload in Server Environment", filed on even date herewith and assigned to the assignee of the present invention.

U.S. patent application, Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application, Ser. No. 11/097,051, entitled "Network Communications for Operating System Partitions", filed on even date herewith and assigned to the assignee of the present invention.

U.S. patent application, Ser. No. 11/097,652, entitled "Configurable Ports for a Host Ethernet Adapter", filed on even date herewith and assigned to the assignee of the present invention.

U.S. patent application, Ser. No. 11/097,430, entitled "System and Method for Parsing, Filtering, and Computing the Checksum in a Host Ethernet Adapter (HEA)", filed on even date herewith and assigned to the assignee of the present invention.

U.S. patent application, Ser. No. 11/097,430, entitled "System and Method for a Method for Reducing Latency in a Host Ethernet Adapter (HEA)", filed on even date herewith and assigned to the assignee of the present invention.

U.S. patent application, Ser. No. 11/097,055, entitled "Method and Apparatus for Blind Checksum and Correction for Network Transmissions", filed on even date herewith and assigned to the assignee of the present invention.

U.S. patent application, Ser. No. 11/096,362, entitled "Method and System for Performing a Packet Header Lookup", filed on even date herewith and assigned to the assignee of the present invention.

U.S. patent application, Ser. No. 11/096,365, entitled "System and Method for Computing a Blind Checksum in a Host Ethernet Adapter (HEA)", filed on even date herewith and assigned to the assignee of the present invention.

FIELD OF THE INVENTION

The present invention relates to network connections for computer devices, and more particularly to network connection tables used for implementing network connections.

BACKGROUND OF THE INVENTION

Computer systems communicate over networks by establishing and using network connections. For example, when a server wishes to be available for access by client computers over a network, the server can enable its networking processes and components to handle requests that are received from clients. Multiple server applications running on the server can be made available to clients that wish to access the server applications over the network. In one example, a client can contact the server, and the server permits a network connection to be established between client and server.

When using Transmission Control Protocol/Internet Protocol (TCP/IP), for example, a TCP connection is represented by connection information such as a pattern of bits divided into different parameters or fields. For example, a "5-tuple" can be used, which is a set of five parameters that define the connection. For TCP/IP, the 5-tuple is included in the header of each packet sent on a network. The five parameters are the identity of the protocol (in this case, TCP), the source IP address (SA), the source port (SP), the destination IP address (DA), and the destination port (DP) for the packet. From the client's point of view, the source address and source port are at the client end, while the destination address and port are at the server end. The 5-tuple connection information allows network packets of data to be communicated between a server process and a client process in a bi-directional fashion. Each connection has a unique 5-tuple pattern, identified in each packet header.

Before a connection is established between the server and client, the server typically advertises the availability of a connection to a particular process to which clients can connect. For example, the server can set up basic connection information for the connection in the form of a "3-tuple" or a "2-tuple" to indicate the available potential connection. A 3-tuple has three parameters for the identity of the protocol to be used: the destination port of the server, and the destination address of the server for the available connection. The 3-tuple is used when the server has multiple IP addresses (e.g., a multi-homed server), where the particular IP address of the available connection must be specified. At other times, or in other embodiments, only a single IP address is provided for server connections, or the server may not care which one of multiple IP addresses are available for connections. In such cases, a 2-tuple can indicate the available connection, which has two parameters: the identity of the protocol and the destination port.

The server can store 5-tuples, 3-tuples, and 2-tuples in TCP connection tables. When the server receives a packet having a header with connection information (a 5-tuple), the server looks for a matching connection in one of the tables to determine which one of multiple connections should receive the packet. Packets in each connection are eventually provided to a server application at the end of that connection. For example, to establish a connection to the server, a client sends a SYN (synchronization) packet to the server. When the server receives the SYN packet, it looks up a matching 3- or 2-tuple pattern in a table to allow a 3-way handshake process with the client to begin that results in a connection being established (the other fields of the 5-tuple in the packet are ignored). Typically, matches for 3-tuples are searched first, and if none are found, matches for 2-tuples are searched. Once the connection is established, 5-tuple patterns are stored in the direct table and are matched by subsequent packets on that connection.

Existing server systems use different methods to lookup TCP connections to determine where to send incoming packets. In one method, three separate tables are provided, each storing new or existing connections, and a simple hash algorithm is used to look up the connections. One table is used for 5-tuple patterns for existing connections, another table is used for 3-tuple patterns for new connections, and the third table is used for 2-tuple patterns for new connections. Each table requires a different hash key length based on the type of pattern.

A problem with this method is the requirement for storage space in main memory to store three different tables. In addition, the lookup procedure can take a long time in some cases, e.g., when a new connection is looked up on the 3-tuple table and no match is found, a second access to main memory is required to the 2-tuple table, increasing processing time.

Another lookup method allows a single table to be used, and a Longest Prefix Match (LPM) algorithm is implemented. This type of algorithm allows the server to find the best match that fits the most stringent or detailed criteria, and if no match is found, more general criteria are used. A tree structure is used, having nodes and leaves, and thus takes time to process. In addition, the LPM method is a complex algorithm, especially when implemented in hardware, requiring more hardware components such as memory, and thus adds to the expense of the system.

Accordingly, what is needed is an apparatus and method for providing a network connection lookup mechanism that requires less processing and access time and is easier, more efficient, and less expensive to implement. The present invention addresses such a need.

SUMMARY OF THE INVENTION

The invention of the present application relates to a network connection table used for implementing network connections. In one aspect of the invention, a method for searching for network connections includes receiving a packet over a network at a computer system and retrieving connection information from the packet, and zeroing particular fields in the connection information if a new connection is to be established. The connection information is converted to an address for a location in a direct table using a table access process. The direct table stores patterns and associated reference information for new connections and existing connections. The connection information is compared with at least one pattern stored in the direct table at the location pointed to by the address to find reference information for the received packet. A similar aspect of the invention provides an apparatus for implementing similar features.

In another aspect of the invention, a method for storing network connection information includes receiving the network connection information, zeroing particular fields in the network connection information if the network connection information references a new connection, converting the network connection information to an address in a direct table using a table access process, and storing the connection information as a pattern and storing reference information in the direct table at a location corresponding to the address. The direct table stores connection information and reference information for new connections and existing connections.

In another aspect of the invention, an apparatus allowing storing and searching of network connection information includes a direct table provided in memory which stores network connection information including 3-tuple and 2-tuple patterns for new network connections and 5-tuple patterns for established network connections, and associated reference information pointing to network connections. A search mechanism implemented on a network adapter device searches for network connection information in the direct table when a packet including connection information is received over a network. The search mechanism creates a search pattern from the packet connection information, the search pattern used for searching for a matching pattern in the direct table to find the associated reference information.

The present invention provides a method and apparatus that allows a single direct table to be used for looking up different types of network connections, including new and established connections, and allows the storing of 2-tuple, 3-tuple, and 5-tuple patterns in the same table. This allows an efficient single memory access to look up all possible types of connections. Furthermore, the present invention allows a direct lookup of a connection using a hash process or other table access mechanism, which is more efficient and inexpensive than existing complex lookup algorithms.

DETAILED DESCRIPTION

The present invention relates to network connections for computer devices, and more particularly to network connection tables used for implementing network connections. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of systems provided in particular implementations. However, one of ordinary skill in the art will readily recognize that this method and system will operate effectively in other implementations. For example, the system architectures and network configurations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 6 in conjunction with the discussion below. While the present invention is described in the context of a TCP/IP protocol client-server system, other protocols (such as User Datagram Protocol (UDP)) and configurations can be used in other embodiments with appropriate modifications. For example, in UDP there are no SYN packets, but 5-tuples can be still be used to direct packets to particular connections/queues.

Figure 1:
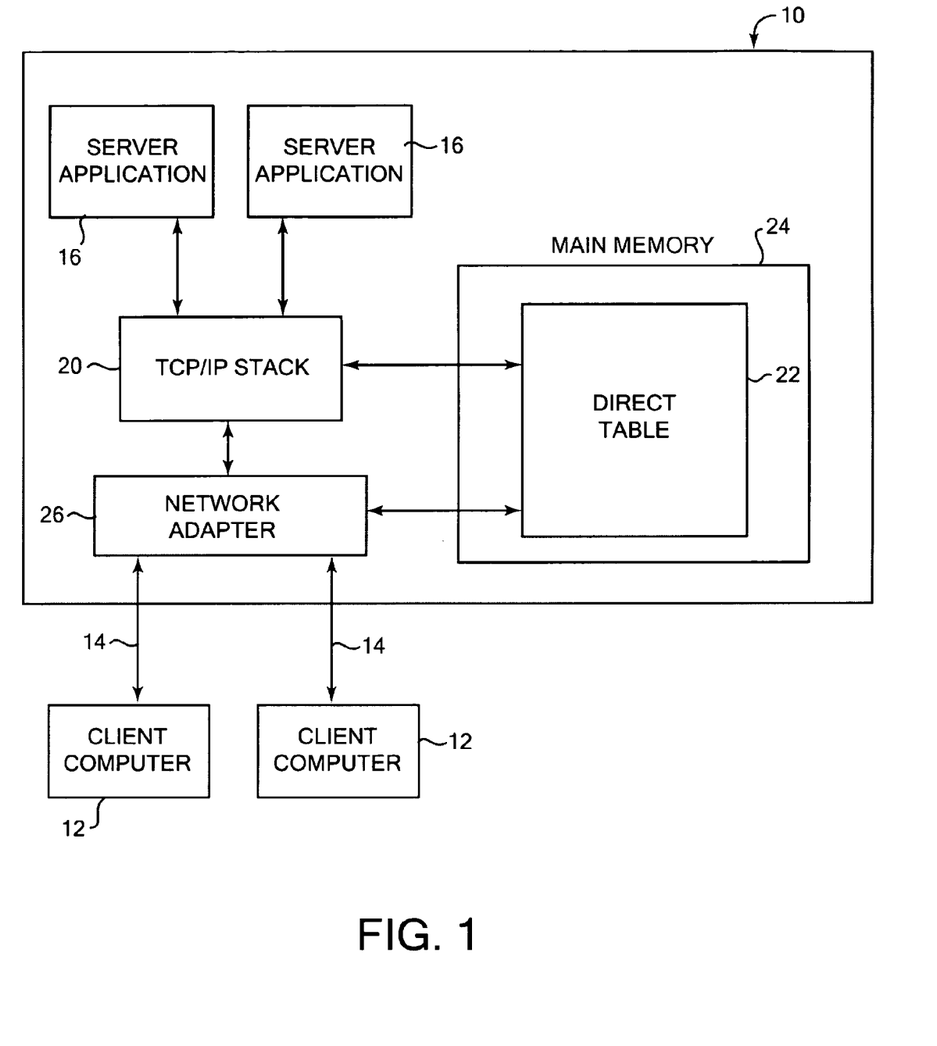
FIG. 1 is a block diagram of an example of a system suitable for use with the present invention.

FIG. 1 is a block diagram of an example of a system 10 suitable for use with the present invention. System 10 is a computer system such as a server, mainframe, desktop client computer, workstation, or other computer or electronic device. In the described embodiment, the system 10 is provided as a server system that can communicate with various other computers 12 via network connections 14. The computers 12 are shown as client computers in the described embodiment, although they can be servers or other computer devices in other embodiments. Any of the client computers 12 can request access to the server system 10 over the network 14 by sending one or more data packets to the server, and once a connection between server and client is established, information can be communicated between them.

Server system 10 runs a number of server applications 16, which are processes running on the server that, within the context of the present invention, can offer services, processing, data, etc., to requesting client computers 12. For example, a server application 16 can be a web server application that provides web page data to clients 12, and/or provides database data to clients 12, or processing data submitted by clients 12.

System 10 includes a TCP/IP stack 20 to manage network connections to the server applications 16. The stack 20 is process code in an operating system or user software space running on the server which handles the incoming and outgoing data to and from the network connections 14. The TCP/IP stack can establish a new network connection to a server application 16 or provide packets to an existing connection. Each server application 16 may have one or more connections. For example, the stack 20 can receive requests from a server application 16 to open a network connection to the application, e.g., when the application 16 is initiated. The server applications 16 send data to the stack 20, which sends the data as TCP/IP network packets to destination ports and addresses over the network 14. The stack 20 also receives network packets provided by other computer devices 12 on the network and provides the packets to the proper server application 16 via network connections.

The TCP/IP stack 20 accesses a direct table 22 of the main memory 24 of the server system 10. Direct table 22 stores the connection information for all new and existing connections to the server 10, as well as associated "reference information" or "connection reference information" that indicates the destination connection(s) for packets received by the system 10. In one embodiment, for example, the reference information can be a queue number that points to a particular connection queue, where packets in the connection queue are eventually processed by the stack 20 and relevant data routed to the connection for that queue and to the server application at the end of that connection. In other embodiments, multiple protocol stacks 20 can be provided, each having its own queue as indicated in the table. In another embodiment, each application 16 could have its own queue. Other destinations within the server, besides connection queues, can be indicated by the reference information in other embodiments.

For example, when a server application 16 requests that a new connection to that application be accepted, the stack 20 stores in the table 22 the appropriate connection information (pattern), along with a queue number indicating a connection queue associated with the connection to the server application that requested the connection. When a client requests a new connection by sending a packet to the system 10, logic on the network adapter 26 looks in the table to determine to which connection queue to connect the client and send the packet (alternatively, a stack 20 can look in the table, but having the adapter 26 perform the task removes load from the server 10 for efficiency). Similarly, once a connection is established, when the adapter 26 receives a packet from a client computer 12, the adapter 26 looks in table 22 to determine the established connection that should receive the packet. These processes are described in greater detail below with respect to FIGS. 2 and 4.

In the present invention, a single direct table 22 stores the connection information for all new and established connections, including 5-tuple, 3-tuple, and 2-tuple patterns, thus reducing the storage requirements for connection tables as compared to prior art implementations, and also reducing the number of memory accesses needed for connection lookup. Furthermore, the connection information is directly accessed in the table through an efficient method such as a hash process (described below), thus requiring less processing than other implementation that use more complex algorithms and structures, such as Longest Prefix Match.

Network adapter 26 is used to provide the physical connection point between the server system 10 and other computers 12 connected to the network 14. Adapter 26 can be, for example, a hardware network interface adapter. The TCP/IP stack 20 receives packets from client computers 12 through the adapter 26, and the stack 20 sends out packets on the network 14 through the adapter 26. Adapter 26 also preferably includes logic, memory, and processing components to allow processing of network information, such as the looking in the direct table 22 for connection information. This offloads the burden from the server onto the network adapter.

Figure 2:
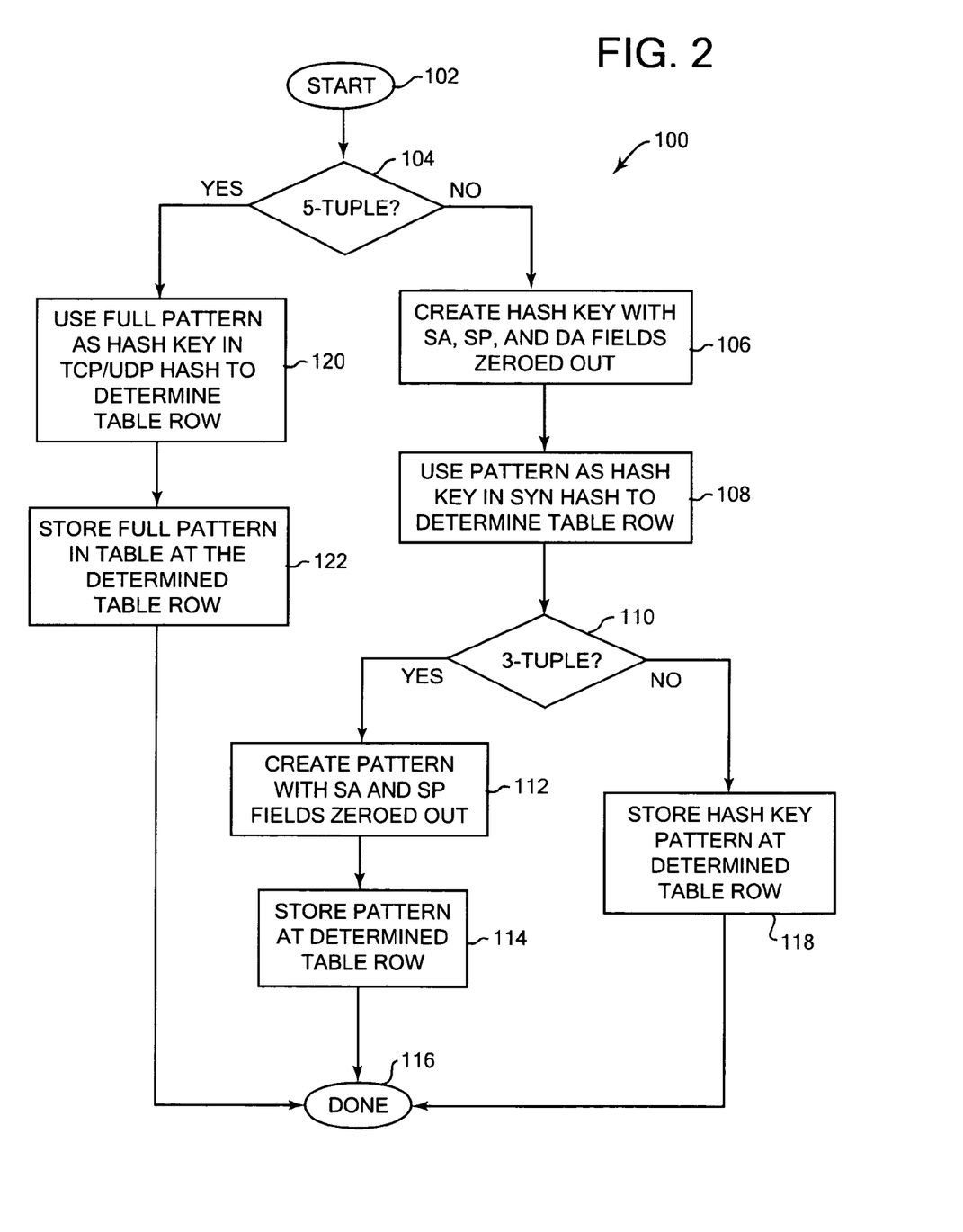
FIG. 2 is a flow diagram illustrating a method of the present invention for storing network connection information in a direct table.

FIG. 2 is a flow diagram illustrating a method 100 of the present invention for storing network connection information in the direct table 22. Method 100 can be implemented in the TCP/IP stack 20 of a server, e.g., in software. Alternatively, method 100 can be implemented as hardware, or a combination of hardware and software. The steps of method 100 (and method 200) can be implemented using program instructions stored on a computer readable medium, such as memory, hard drive, optical disk (CD-ROM, DVD-ROM, etc.), magnetic disk, etc.

Method 100 typically starts when there is a need to store network connection information in the direct table 22. When a server application 16 is initialized or requests that a connection be opened (set up), this connection setup is considered a "new connection" herein, and connection information concerning this new connection is to be stored in direct table 22. The server application 16 provides a request to the TCP/IP stack 20 to accept any client requests to access that server application, and provides a protocol (TCP, for example) and server TCP port (and in some cases IP address) to the stack for that application. Furthermore, connection information for an established connection is to be stored typically after the client and server have established communication, e.g., after a 3-way handshake when using the TCP protocol.

The method starts at 102, and in step 104, it is checked whether a 5-tuple of connection information (a 5-tuple "pattern") is to be stored. In the context of the method 100, if a 5-tuple pattern is not to be stored, then a 3-tuple or 2-tuple pattern of connection information is to be stored.

A 5-tuple pattern, as referred to herein, is a string of bits (e.g., 104 bits in many common TCP/IP implementations) that is designated to define five connection parameters: identification of protocol, source (client) address, source port, destination (server) address, and destination port. A 5-tuple pattern is to be stored in the table when a connection has just been established, when source (client) and destination (server) are known. The 5-tuple to be stored in table 22 is received in a header of a packet received at the end of the 3-way handshake. In contrast, a 3-tuple pattern, as referred to herein, includes three connection parameters: protocol identification, destination address, and destination port, and is to be stored when a server application has requested that a connection to that application should be made available to clients. The 3-tuple pattern has the other two fields of the 5-tuple zeroed out. Similarly, a 2-tuple pattern of connection information includes two parameters: protocol identification, and destination port, and has the other three fields of the 5-tuple zeroed out. A 2-tuple pattern can be stored instead of a 3-tuple pattern when a new connection is to be made available, and is used when a destination address does not need to be specified. For example, some server systems 10 may have multiple available IP addresses to which to connect, so that the destination address must be specified using a 3-tuple pattern. Other systems may have only one address, or may not care which of multiple destination addresses are connected to by clients, so that a 2-tuple pattern can be used.

If a 5-tuple pattern is to be stored, then the process continues to step 120, detailed below. If a 3-tuple or 2-tuple pattern is to be stored, the process continues to step 106. In step 106, a hash key is created by including the received destination port (DP) and protocol (P) from the server application in predetermined fields, and zeroing out fields for source address (SA), source port (SP), and destination address (DA).

In next step 108, the pattern resulting from step 106 is used as a hash key in a SYN hash process that is performed to determine the table row in the direct table 22 at which to store a pattern of network connection information. A table "row" (or "location") as referred to herein indicates to a location or space in the table that can store multiple entries and can be addressed; table rows can be implemented in various ways. The SYN hash uses only the DP and protocol fields of the full pattern to determine the entry of the table 22. The SYN hash is a hash algorithm that converts a large-valued key to a smaller value that can be indexed into a table having a smaller amount of rows, where the smaller value is well distributed within the range of rows for the table. A SYN hash is used when a 3-tuple or 2-tuple connection is looked up in direct table 22, e.g., when a SYN packet is received by the server from a client. A SYN packet, in the TCP protocol, is the initial packet that a client sends to the server to initiate a connection. An example of a SYN hash process of the present invention is described below with reference to FIG. 7a. In other embodiments, other table access mechanisms/processes other than a hash process can be used, e.g., a table access mechanism that, given a key, provides access to a row in a table that has one or more entries.

In next step 110, the process checks whether the pattern to be stored is a 3-tuple or a 2-tuple. By placing a 3- or 2-tuple pattern in the connection table, it is indicating that that application is listening for connections. If the pattern is a 3-tuple, i.e., if the requesting server application has provided a protocol, destination port, and destination address, then the process continues to step 112, in which a 3-tuple pattern is created with P, DP, and DA fields from the server application included in the proper fields and the SA and SP fields zeroed out. In step 114, the pattern resulting from step 112 is stored in the next available entry (slot) at the table row of table 22 determined in step 108. In addition, a queue number is stored at the determined table entry with the 3-tuple pattern. The queue number, for example, identifies which connection queue of the server that an incoming SYN packet should be stored in to be processed. Each connection queue is associated with a particular connection to a server application 16. Thus, when the TCP/IP stack 20 processes a packet in a connection queue, it sends the appropriate data to the server application associated with that connection. In other embodiments, e.g., if connection queues are not implemented, other types of reference information can be stored in the entry instead of a queue number to indicate the connection associated with a stored pattern. After step 114, the process is complete at 116.

If the pattern to be stored is a 2-tuple at step 110, i.e., if the requesting server application has provided a protocol and a destination port (and no destination address), then the process continues to step 118, in which the hash key pattern resulting from step 106 is stored in the next available entry at the table row of table 22 as determined in step 108. The hash key pattern has the SA, SP, and DA fields zeroed out, and thus is identical to a 2-tuple pattern. In addition, a queue number (for example) is stored at the table entry with the 2-tuple pattern (hash key) identifying which connection queue of the server that a matching SYN packet should be stored in to be processed. After step 118, the process is complete at 116.

If at step 104 the process finds that a 5-tuple pattern is to be stored, then step 120 is performed. In step 120, the received full pattern is used as a hash key, and a TCP/UDP hash is performed to determine the row of table 22 at which to store the received 5-tuple pattern. A TCP/UDP hash algorithm uses all fields of the pattern, i.e., the entire bit pattern, to determine the address value for a table row in table 22, and thus differs from the SYN hash algorithm of step 108, which zeroed out three fields of the full pattern for a hash key. An example of a TCP/UDP hash process of the present invention is described below with reference to FIG. 7b.

In next step 122, the received 5-tuple pattern of connection information is stored in direct table 22 at the next available entry in the table row determined by the hash algorithm of step 120. In addition, a queue number (or other type of reference information) is stored at the table entry with the 5-tuple pattern identifying which connection queue of the server in which a matching packet should be stored. The process is thus complete at 116.

It should be noted that each entry in each row of the table 22 is a generic entry that can store a 5-tuple, 3-tuple, or 2-tuple pattern; the 3-tuple and 2-tuple patterns are actually 5-tuples with particular fields zeroed. The zeroes in the 3-tuple and 2-tuple patterns create invalid 5-tuples, so that there is no overlay in the domain of 2-, 3-, and 5-tuples in the table. Thus, the invention allows that a search for a 5-tuple pattern will not find a 3-tuple or 2-tuple pattern by mistake.

Figure 3:
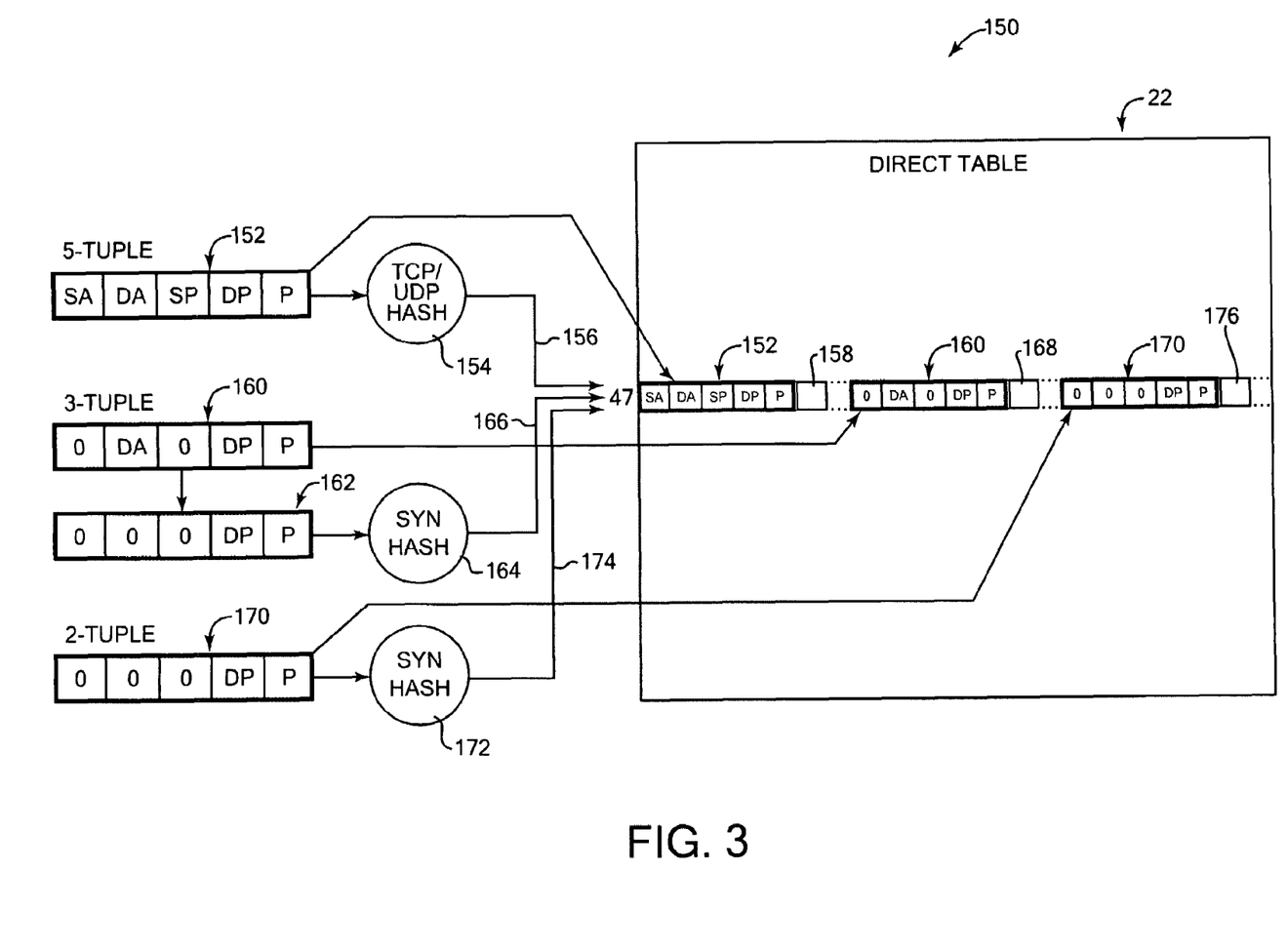
FIG. 3 is a diagrammatic illustration of an example of storing of connection information in a direct table according to the present invention.

FIG. 3 is a diagrammatic illustration 150 of an example of storing of connection information in a direct table according to the present invention. Illustration 150 shows the three forms of connection information, 5-tuple, 3-tuple, and 2-tuple, being stored in direct table 22 as described above with respect to FIG. 2.

When a 5-tuple pattern 152 is being stored in table 22, the entire pattern 152 is used as a hash key in a TCP/UDP hash process 154. The result of the hash process 154 is used as an address 156 to a row in the direct table 22, which in this example is row "47," and the 5-tuple pattern is stored in the next available entry (i.e., slot) in that row. In addition, a queue (reference) number 158 is stored at the same row and entry with the 5-tuple pattern, which in the described example indicates the particular connection queue which matching packets should be stored to be eventually processed for the associated connection and server application 16.

A 3-tuple pattern 160 can also be stored in the table 22. The 3-tuple pattern 160 has its SA and SP fields zeroed out. To create a hash key 162 for the hash process, the pattern 160 has its DA field zeroed out as well. The hash key 162 is provided to a SYN hash process 164, and the result of the hash process 164 is used as an address 166 to a row in the direct table 22. The 3-tuple pattern 160 is stored in the next available entry at that row (in this example row 47), and a reference (e.g., queue) number 168 is stored at the same row and entry, which in this example indicates the particular connection queue for the particular connection and server application 16.

A 2-tuple pattern 170 can also be stored in the table 22. The 2-tuple pattern 170 has its SA, SP, and DA fields zeroed out. Thus, the pattern 170 can act as a SYN hash key as well, and is provided to a SYN hash process 172. The result of the hash process 172 is used as an address 174 into the direct table 22. The 2-tuple pattern 170 is stored in the next available entry at the row indicated by address 172 (in this example row 47), and a reference (e.g., queue) number 176 is stored at the same row and entry.

It should be noted that, in this example, 5-tuple pattern 152, 3-tuple pattern 160, and 2-tuple pattern 170 are all stored in entries of the same row of direct table 22 (also, multiple 5-tuples, 3-tuples, or 2-tuples can be stored in the same row). In the example of FIG. 3, the TCP/UDP hash process 154 and the SYN hash processes 164 and 172 have taken different hash key patterns and have provided the same address (row 47) of the direct table 22 to illustrate this feature. The use of different hash algorithms allows a single table 22 to store multiple types of patterns in any row, thereby eliminating the inefficient use of multiple tables as in prior implementations.

In addition, multiple entries are stored in each row of the table, which allows the hash process to reduce the number of table rows that are available to be addressed (e.g., the hash processes 154, 164, and 172 produce a smaller range of addresses in the table than the possible range of patterns). For example, a predetermined number of entries can be available for pattern storage at row 47 in FIG. 3.

In some embodiments, an overflow storage area can also be provided to offer additional entries for storing patterns that have overflowed the available space in any particular row of table 22. For example, a linked list of additional entries can be stored, or a secondary table similar to the structure of table 22 can store overflow patterns for each row.

Figure 4:
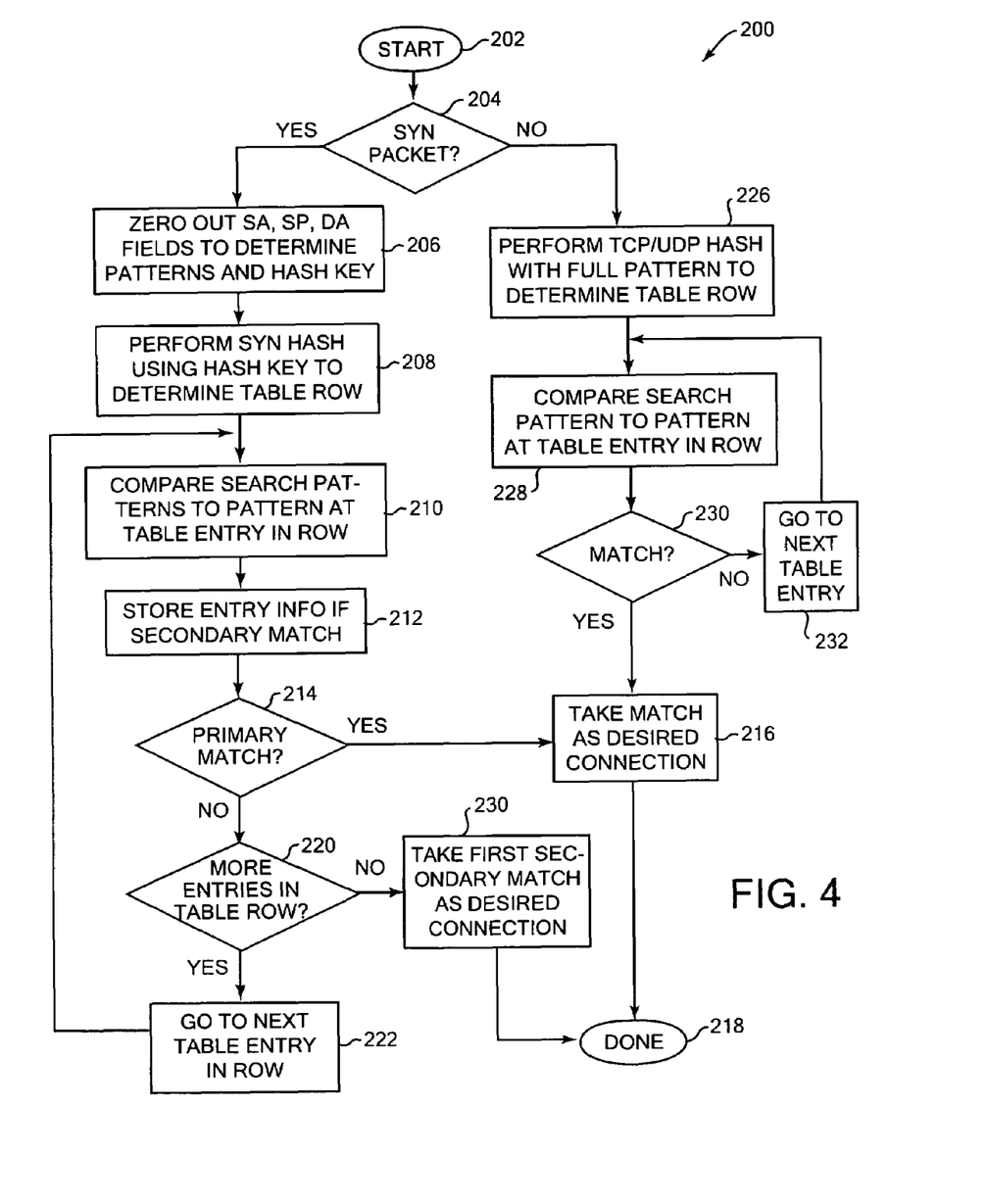
FIG. 4 is a flow diagram illustrating the operation of a basic embodiment of a search mechanism of the present invention.

FIG. 4 is a flow diagram illustrating a method 200 of the present invention for searching for network connection information in the direct table 22. Method 200 can be implemented in hardware, e.g. by a "search mechanism" implemented on the network adapter 26. Alternatively, method 200 can be implemented as hardware, or a combination of hardware and software.

Method 200 typically starts when there is a need to search for network connection information in the direct table 22. Information for a new connection is to be searched typically when the adapter 26 receives a packet from a client over network 14. The packet includes a header that includes 5-tuple pattern. When it is a SYN packet for establishing a new connection, only two or three fields of the 5-tuple pattern are used to search for a 2-tuple or 3-tuple pattern, respectively. When it is a packet received during communications on a connection that has already been established, the method uses the entire 5-tuple pattern.

The method starts at 202, and in step 204, it is checked whether the received packet is a SYN packet. If so, the process continues to step 206, in which particular fields of the received pattern in the header of the SYN packet are retrieved, and other fields are zeroed out to create a search pattern to use for searching and to determine a hash key. To create the 3-tuple search pattern to use for searching, the received 3-tuple parameters (P, DP, DA) are included in a search pattern having the SA and SP fields zeroed out. To create the 2-tuple search pattern to use for searching and the hash key, the received 2-tuple parameters (P, DP) are included in a search pattern having the SA, SP, and DA fields zeroed out.

In next step 208, a SYN hash procedure is performed using the hash key of step 206 to determine the address of a table row in table 22. The SYN hash algorithm used is the same as the one used when storing 3-tuple or 2-tuple connection information in the table 22, as explained above with reference to FIG. 2. An example of a SYN hash process of the present invention is described below with reference to FIG. 7a. Also as explained above, other table access mechanisms/processes other than hash processes can be used to determine a row address. In step 210, the search patterns of step 206 are compared to the pattern stored at a table entry of the determined row (if it is the first time step 208 is performed for the current search, the table entry is the first entry in the row). Thus, the 3-tuple search pattern is compared to the pattern, and the 2-tuple search pattern is compared to the pattern. The comparison using the 3-tuple pattern can be considered the "primary" comparison, and the comparison using the 2-tuple patterns can be considered the "secondary" comparison.

In step 212, the process stores the information in the table entry if the 2-tuple search pattern matches the pattern in the current table entry, i.e. if a secondary match is made. This information can be stored in a convenient buffer, and can include the pattern and the reference information associated with the pattern as stored in the table. This information may be used later in the process at step 224 if no primary matches are found in the table row, as described below.

In step 214, the process checks whether there is a match between the 3-tuple search pattern and the pattern stored at the current table entry. If there is a primary match, in step 216 the matching pattern entry is taken as the desired connection, and the queue number (or other type of reference information) that is associated with the matching pattern in the table 22 is read to determine the connection and server application 16 to which to route the received packet. The process is then complete at 218.

If there is no match of the 3-tuple search pattern to the pattern in step 214, then the process continues to step 220, where the process checks if there are more entries in this table row holding patterns that have not yet been compared. If so, in step 222, a table entry pointer is moved to the next entry in the table row, and the process returns to step 210 to compare the search patterns to the pattern stored at this next table entry. As described above, some embodiments may use an additional table or other storage structure to provide additional entries that store additional patterns for the row in the case of overflow.

If no primary match is found in step 214 and there are no more entries in the table row to compare at step 220, then the process continues to step 230, in which the first 2-tuple secondary match of the row is taken as the desired connection. This first secondary matching entry information is known from the buffer in which the secondary match entry information was stored in step 212 each time a secondary match was found for the current row. The reference information (queue number) associated with the matching pattern in the table 22 is read to determine the connection and server application 16 to which to route the received packet, and the process is complete at 218.

If the received packet in the check of 204 is determined to be a non-SYN packet, then the process continues to step 226, in which a TCP/UDP hash operation is performed using the full pattern provided in the header of the packet as the hash key. An example of a TCP/UDP hash process of the present invention is described below with reference to FIG. 7b. In step 228, the received full pattern is used as the search pattern and compared to the 5-tuple pattern stored at a table entry in the table row pointed to by the result of the hash operation of step 226 (the table entry is the first entry in the row the first time step 228 is performed). As explained above, each used table entry stores a pattern and reference information.

In step 230, the process checks whether there is a match between the search pattern and the pattern stored in the table. If not, then in step 232, the table entry pointer is moved to the next entry in the table row, and the process returns to step 228 to compare the search pattern to the pattern stored at this next table entry. If there is a match in step 230, then the process continues to step 216, in which the matching pattern entry is taken as the desired connection, and the queue number (or other reference information) that is associated with the matching pattern in the table entry is read to determine the connection and server application 16 to which to route the received packet. The matching connection information can be provided to the appropriate component of server system 10 to forward it to an application 16. The process is then complete at 218.

In alternate embodiments, other methods can be used to compare and find primary and secondary matches for 3-tuple and 2-tuples. For example, the step 212 of storing secondary match information can be skipped, and only after all the patterns stored in the entries of the row (and in any overflow entries for that row) are found not to match the 3-tuple search pattern can the 2-tuple search pattern be compared to the patterns stored in the row.

Figure 5:
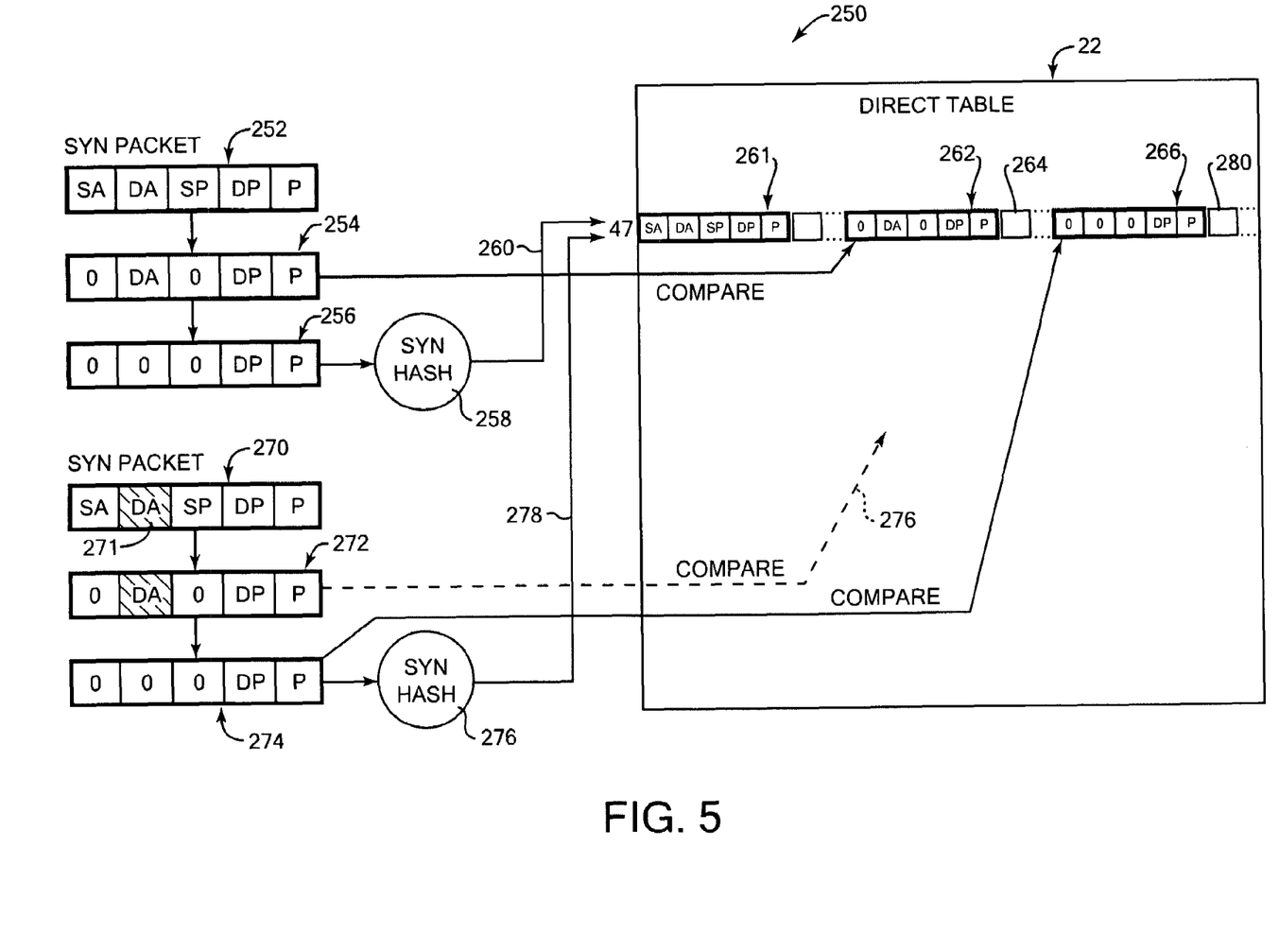
FIG. 5 is a diagrammatic illustration of a search for connection information in a direct table according to the present invention when a packet is received to establish a new connection.

FIG. 5 is a diagrammatic illustration 250 of a search for connection information in a direct table according to the present invention when a SYN packet is received to establish a new connection, as described above with reference to FIG. 4.

In a first example, a pattern 252 is created from the information in the received SYN packet. Since it is a SYN packet, a 3-tuple or 2-tuple pattern must be searched in the direct table 22. The SA and SP fields of the created pattern are zeroed out to create the 3-tuple search pattern 254, as shown. The DA field of the received pattern is additionally zeroed out to create the hash key 256 (which is also a 2-tuple search pattern). The SYN hash process 258 results in an index or address 260 to a row in the direct table 22, which in this example is row "47." The 3-tuple search pattern 254 is then compared to the pattern 261 stored at the (first) table entry in the row. Since pattern 261 is a 5-tuple pattern, there is no match, so the process moves to the next entry of the row to compare the 3-tuple search pattern to pattern 262. In this example, there is a match between the patterns, so that the queue number 264 associated with the pattern is retrieved. According to the method of FIG. 4, a 2-tuple search pattern the same as hash key 256 is additionally simultaneously compared to the patterns 261 and 262 at the same time as the 3-tuple search pattern is compared; however, these comparisons are irrelevant in this example, since pattern 261 did not match the 2-tuple search pattern, and pattern 262 matched the 3-tuple search pattern.

In another example, a pattern 270 is created from the information in a received SYN packet. The DA field 271 in pattern 270 is different than the DA field of pattern 252. The SA and SP fields of the created pattern are zeroed out to create the 3-tuple search pattern 272. The DA field of the pattern is zeroed out to create the 2-tuple search pattern/hash key 274. The SYN hash process 276 results in an index or address 278 to a row in the direct table 22, in this example row "47" (which is the same row as in the example described above). The 3-tuple search pattern 272 and 2-tuple search pattern 274 are then compared to the pattern 261 stored at the (first) table entry in the row. Since pattern 261 is a 5-tuple pattern, there are no matches, so the process moves to the next entry of the row and compares the 3-tuple and 2-tuple search patterns to pattern 262. In this example, there are again no matches. Similarly, the 3- and 2-tuple search patterns are compared to the next entry in the row, pattern 266. Here, the 3-tuple pattern does not match, but a secondary match is found for the 2-tuple pattern, so the entry information is stored (step 212 in FIG. 4). In this example, this comparison of the search patterns continues for all the entries in the row (including any overflow entries), and no primary match is found for any entry in the row, as indicated by dashed line 276. Thus, the first secondary match from the row is chosen. In this example, the first secondary match is for pattern 266. The queue number 280 associated with the pattern 266 is retrieved from storage to determine the connection to which to route the received packet.

Figure 6:
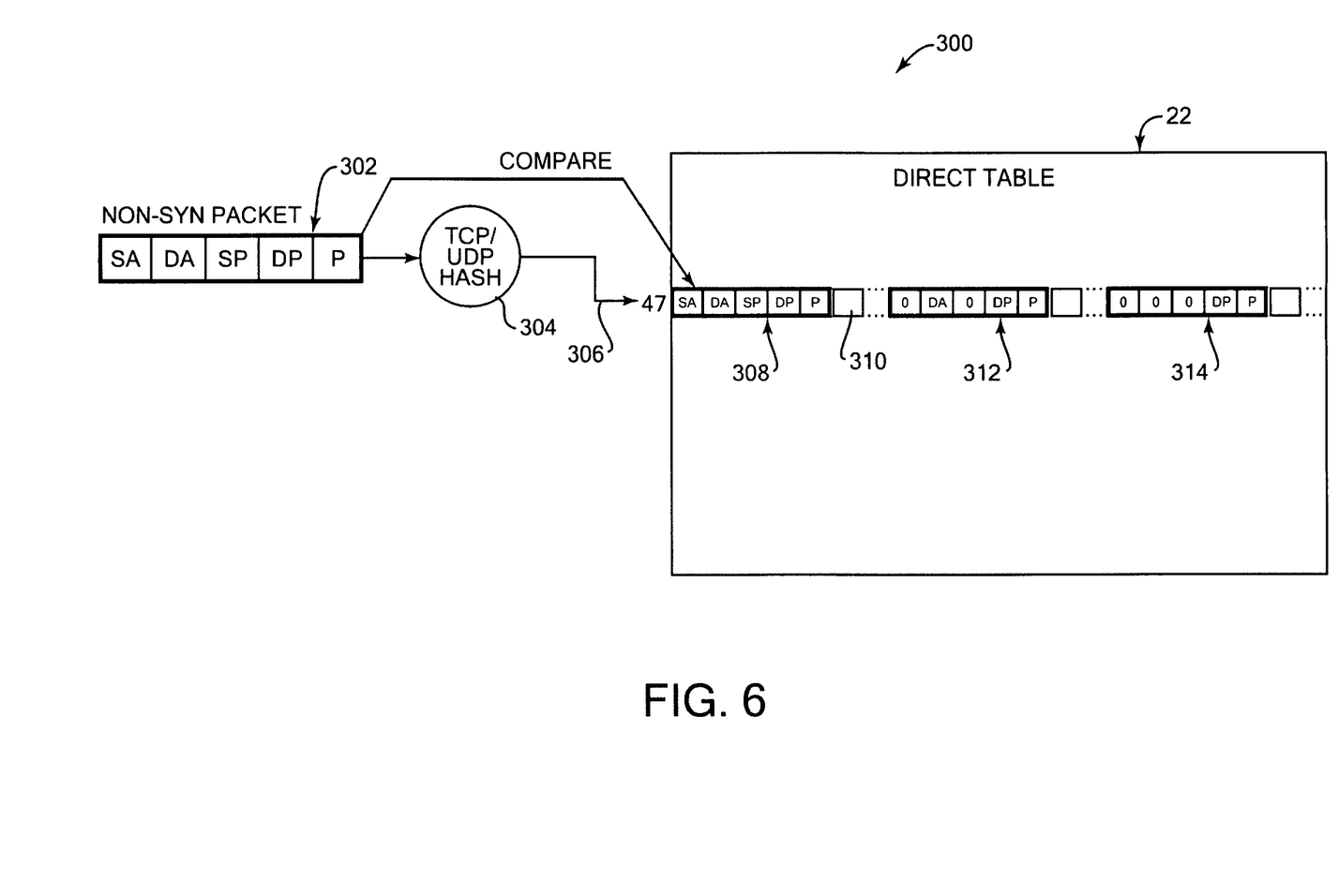
FIG. 6 is a diagrammatic illustration of a search for connection information in a direct table according to the present invention when a packet is received for an established connection.

FIG. 6 is a diagrammatic illustration 300 of a search for connection information in a direct table 22 according to the present invention when a non-SYN packet is received, as described above with reference to FIG. 4.

In the example shown, a received non-SYN packet includes a header having a 5-tuple pattern 302. Since it is a non-SYN packet, a 5-tuple pattern need not be modified and can be directly used as a search pattern for the direct table 22. A hash key that is the same as the 5-tuple pattern 302 is used for a TCP/UDP hash process 304, resulting in an index or address 306 to a row in the direct table 22, in this case row "47." The 5-tuple search pattern 302 is compared to pattern 308 stored at that table entry. In this example, there is a match between the patterns, so that the reference information (e.g., queue number) 310 stored in table 22 and associated with the pattern 308 is retrieved. If no match had been found, the pattern in the next entry of the row would be compared, and so on, including any filled overflow entries.

Figure 7A:
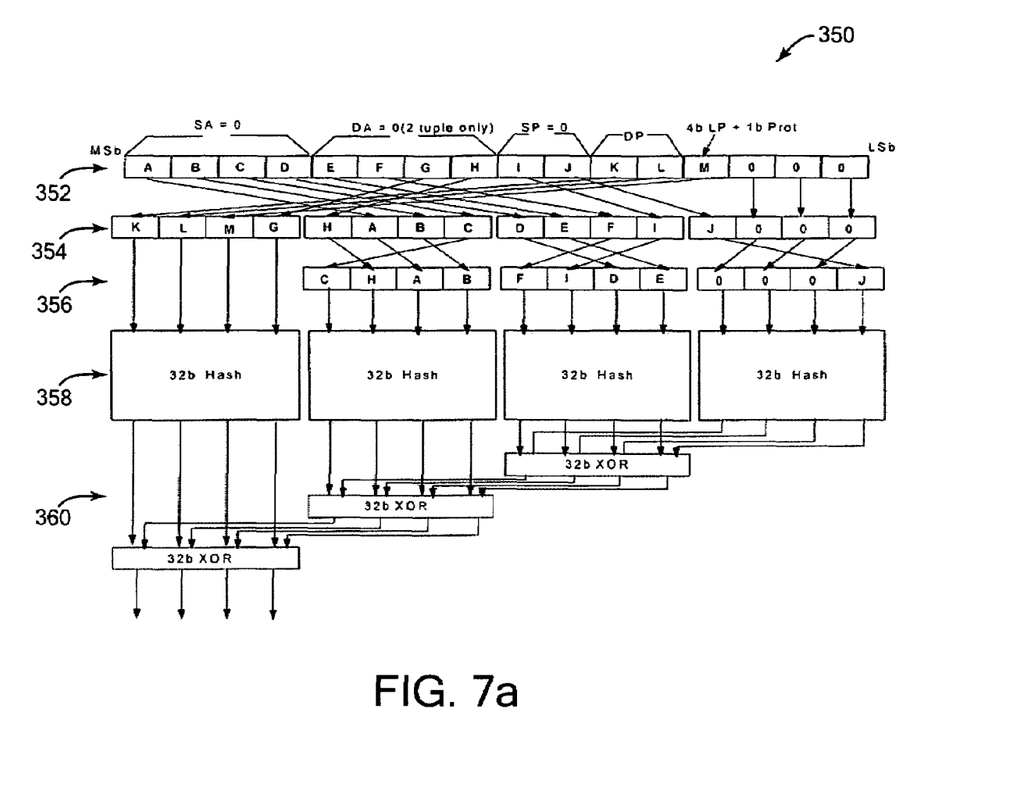
FIGS. 7a and 7b are a block diagrams illustrating hash processes of the present invention.
Figure 7B:
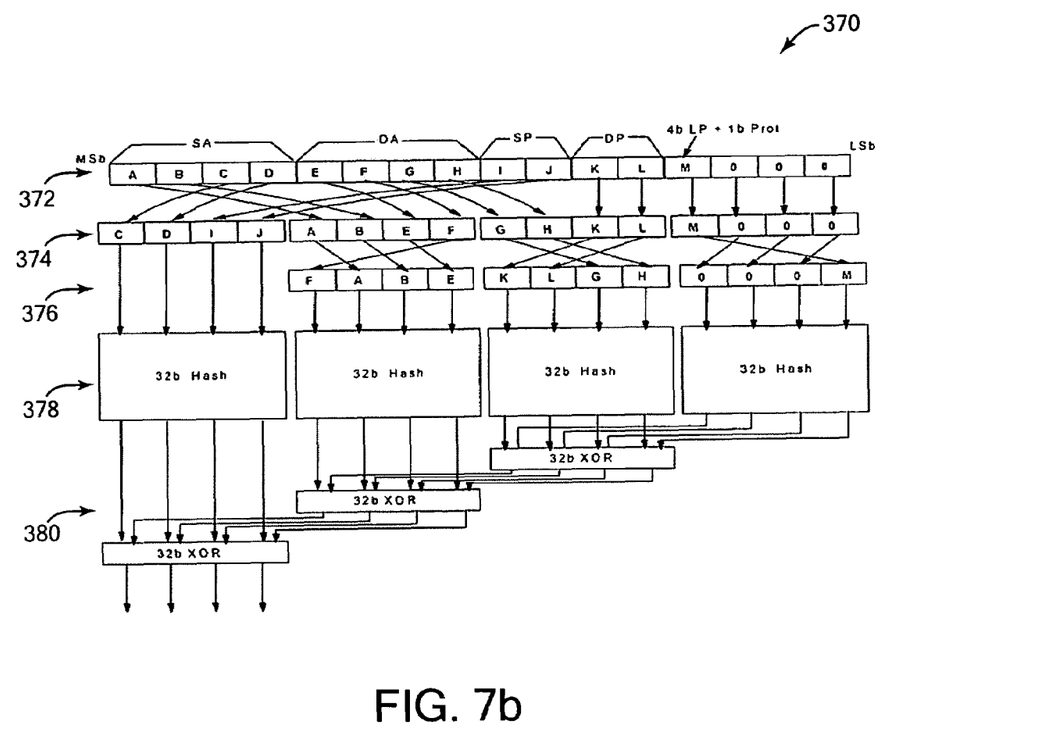

FIGS. 7a and 7b illustrate hash processes that can be used with the present invention. In these examples, 6-tuples of connection information are used instead of the 5-tuples described above. The additional tuple is used to identify a logical port (LP) number and protocol (TCP or UDP), for an implementation of the invention that uses logical ports as described in copending patent application entitled, "Network Communications for Operating System Partitions", application Ser. No. 11/097,051, filed on Apr. 1, 2005. The other parts of the connection information pattern are the same as described above. These processes can be modified appropriately in other embodiments that do not use this additional tuple. The hash output number is an n-bit number with a one-to-one correspondence to the input key.

FIG. 7a illustrates a SYN hash process 350 of the present invention that can be used in step 108 of FIG. 2 and step 208 of FIG. 4. A 6-tuple pattern 352 includes 2-tuple connection information (SA, SP, and DA zeroed) and is to be used as a hash key in the SYN hash process 350. The bytes of pattern 352 are swapped as shown to create a pattern 354. This swapping is chosen so that the "entropy" (the most variation) is in the most significant bits on the left side, so that the distribution of patterns in the direct table 22 is the most efficient. Maximum output entropy is contained in the hash process' most significant bits by moving the byte fields of the original key which contain the most entropy to the most significant bytes of the key. In this example, the key before the swapping is ABCDEFGHIJKLM000, and the pattern after the swap is KLMGHABCDEFIJ000.

Additional swapping is performed to create pattern 356, and each 32 bits are subject to a 32 bit hash 358. This hash 358 is can be a standard hash algorithm. The results of the hash are XORed at stage 360 as shown, to result in the final 32 bit pattern which is the result of the hash process. The highest bits of the result (as required for the direct table) are used to calculate an index into the direct table 22.

FIG. 7b illustrates a TCP/UDP hash process 370 of the present invention that can be used in step 120 of FIG. 2 and step 226 of FIG. 4. A 6-tuple pattern 372 includes 5-tuple connection information and is to be used as a hash key in the hash process 370. The bytes of pattern 372 are swapped as shown to create a pattern 374. This swapping is chosen so that the entropy is in the most significant bits, similar to process 350 described above. In this example, the key before the swapping is ABCDEFGHIJKLM000, and the pattern after the swap is CDIJABEFGHKLM000.

Additional swapping is performed to create pattern 376, and each 32 bits are subject to a 32 bit hash 378. This hash 378 is can be a standard hash algorithm. The results of the hash are XORed at stage 380 as shown, to result in the final 32-bit pattern which is the result of the hash process. The highest bits of the result (as required for the direct table) are used to calculate an index into the direct table 22.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for searching for network connections for devices on a network, the method comprising:
   receiving a packet over a network at a computer system and retrieving connection information from the packet;
   zeroing particular fields in the connection information in response to the packet being a connection-starting packet that establishes a new connection, and not zeroing the particular fields in response to the packet being provided for an existing connection;
   converting the connection information to an address for a location in a direct table using a table access process, wherein the direct table stores a plurality of patterns and associated reference information, at least two of the stored patterns having different types, wherein each of the patterns of the first type indicates an associated new connection is available and each of the patterns of the second type is associated with using an associated existing connection; and
   comparing the connection information with at least one pattern stored in the direct table at the location pointed to by the address to find reference information for the received packet.

2. The method of claim 1 wherein the reference information indicates a connection within the computer system through which to send the received packet.

3. The method of claim 2 wherein the reference information is stored in the same entry of the direct table as the pattern, and wherein a match of the connection information and the pattern allows the reference information stored at that entry to be retrieved from the direct table.

4. The method of claim 1 wherein the table access process is a hash process.

5. The method of claim 4 wherein converting the connection information to an address using a hash process includes using a hash key that is derived from the connection information.

6. The method of claim 5 wherein the hash process moves the byte fields of the hash key which contain the most entropy to the most significant bytes of the hash key.

7. The method of claim 5 wherein the first type of stored pattern is a 3-tuple pattern having two fields zeroed out or a 2-tuple pattern having three fields zeroed out, and the second type of stored pattern is a 5-tuple pattern having no fields zeroed out, and wherein the direct table can store any of these types of patterns in any entry of the direct table.

8. The method of claim 7 wherein when comparing the connection information to patterns in the direct table for a new connection, the address to the location of the direct table is provided using a first hash process on the connection information, and when comparing the connection information to patterns in the direct table for a established connection, the address to the location is provided using a second, different hash process on the connection information.

9. The method of claim 1 wherein all of the retrieved connection information is used for an established connection as a 5-tuple pattern and compared with at least one of the patterns stored in the direct table, and the connection information with particular fields zeroed out is used for a new connection as a 3-tuple pattern or a 2-tuple pattern and compared with at least one of the patterns stored in the direct table.

10. The method of claim 1 wherein the comparing includes comparing the connection information with the patterns stored in a plurality of entries of the direct table until a match is found.

11. The method of claim 10 wherein comparing the connection information includes making primary comparisons using a 3-tuple search pattern created from the connection information and making secondary comparisons using a 2-tuple search pattern created from the connection information, wherein if no primary match is found to a pattern, then a secondary match is used to determine the reference information for the received packet.

12. The method of claim 11 wherein the first secondary match of the 2-tuple search pattern to one of the patterns in the direct table is used to determine the reference information for the received packet.

13. A method for storing network connection information for devices on a network, the method comprising:
   receiving the network connection information;
   zeroing particular fields in the network connection information in response to the network connection information setting up and making available a new connection, and not zeroing the particular fields in response to the network connection information being provided for an existing connection;
   converting the network connection information to an address in a direct table using a table access process; and
   storing the connection information as a pattern and storing connection reference information in the direct table at a location corresponding to the address, wherein the direct table stores connection information and reference information for new connections that are available for connection, and existing connections that have been established.

14. The method of claim 13 wherein the connection reference information for a network connection is stored in the same entry of the direct table as the pattern, such that when a packet is received that includes network connection information, a match of the network connection information and the pattern allows the reference information stored at that entry to be retrieved from the direct table.

15. The method of claim 13 wherein the table access process is a hash process.

16. The method of claim 15 wherein converting the connection information to an address using a hash process includes using a hash key that is derived from the connection information.

17. The method of claim 16 wherein the direct table stores 3-tuple patterns having two fields zeroed out, 2-tuple patterns having thee fields zeroed out, and 5-tuple patterns having no fields zeroed out, and can store any of these types of patterns in any entry of the direct table.

18. The method of claim 17 wherein when storing 3-tuple patterns and 2-tuple patterns for new connections, the address to the direct table is provided using a first hash process on the network connection information, and when storing 5-tuple patterns for established connections, the address to the direct table is provided using a second, different hash process on the network connection information.

19. The method of claim 13 wherein the zeroing particular fields in the network connection information includes zeroing out fields to create a 3-tuple pattern or a 2-tuple pattern.

20. The method of claim 19 wherein the 3-tuple pattern is created by zeroing out Source Address and Source Port fields in the pattern, and the 2-tuple pattern is created by zeroing out Source Address, Source Port, and Destination Address fields in the pattern.

21. The method of claim 13 wherein when storing a pattern for an established connection, the connection information is stored as a 5-tuple pattern in the direct table, and when storing a pattern for a new connection, the connection information is stored as a 3-tuple pattern or a 2-tuple pattern in the direct table with the particular fields zeroed out.

22. The method of claim 13 wherein a pattern and reference information for a new connection is stored in the direct table when a server application requests that a connection be set up.

23. The method of claim 13 wherein a pattern and reference information for an established connection is stored in the direct table when a packet is received at a server storing the direct table from a client across a network.

24. An apparatus for searching for network connections for devices on a network, the apparatus comprising:
a mechanism for receiving a packet over a network at a computer system and retrieving connection information from the packet;
a mechanism for zeroing particular fields in the connection information in response to the packet being a connection-starting packet that establishes a new connection, and not zeroing the particular fields in response to the packet being provided for an existing connection;
a mechanism for converting the connection information to an address for a location in a direct table using a table access process, wherein the direct table stores a plurality of patterns and associated reference information, at least two of the stored patterns having different types, wherein each of the patterns of the first type indicates an associated new connection is available and each of the patterns of the second type is associated with using an associated existing connection; and
a mechanism for comparing the connection information with at least one pattern stored in the direct table at the location pointed to by the address to find reference information for the received packet.

25. The apparatus of claim 24 wherein the reference information indicates a connection within the computer system through which to send the received packet, wherein the reference information is stored in the same entry of the direct table as the pattern, and wherein a match of the connection information and the pattern allows the reference information stored at that entry to be retrieved from the direct table.

26. The apparatus of claim 24 wherein the table access process is a hash process, and wherein the mechanism for converting the connection information to an address using a hash process includes a mechanism for using a hash key that is derived from the connection information.

27. The apparatus of claim 26 wherein the direct table stores 3-tuple patterns having two fields zeroed out, 2-tuple patterns having three fields zeroed out, and 5-tuple patterns having no fields zeroed out, and can store any of these types of patterns in any entry of the direct table.

28. The apparatus of claim 24 wherein when the mechanism for comparing uses all of the retrieved connection information for an established connection as a 5-tuple pattern to be compared with at least one of the patterns stored in the direct table, and uses the connection information with zeroed out particular fields for a new connection as a 3-tuple pattern or a 2-tuple pattern to be compared with at least one of the patterns stored in the direct table.

29. An apparatus allowing storing and searching of network connection information, the apparatus comprising:
a direct table provided in memory and operative to store network connection information including 3-tuple and 2-tuple patterns for new available network connections and 5-tuple patterns for established network connections, and associated reference information pointing to network connections; and
a search mechanism implemented on a network adapter device and coupled to the direct table, the search mechanism operative to search for network connection information in the direct table when a packet including connection information is received over a network, wherein the search mechanism creates a search pattern from the packet connection information, the search pattern used for searching for a matching pattern in the direct table to find the associated reference information.

30. The apparatus of claim 29 wherein the 3-tuple and 2-tuple patterns are 5-tuples having a plurality of fields zeroed out, and wherein the search pattern created for a new available connection is a 3-tuple or a 2-tuple pattern which is a 5-tuple having a plurality of fields zeroed out.

31. The apparatus of claim 29 wherein the search mechanism converts the packet connection information into a hash key to be used with a hash process to locate a row in the direct table having a pattern matching the search pattern.

* * * * *